O. A. SKIBBE AND O. DIEBALL.
CASTER LOCKING MECHANISM FOR STANDS, TABLES, AND THE LIKE.
APPLICATION FILED SEPT. 28, 1917.
1,304,711.
Patented May 27, 1919.
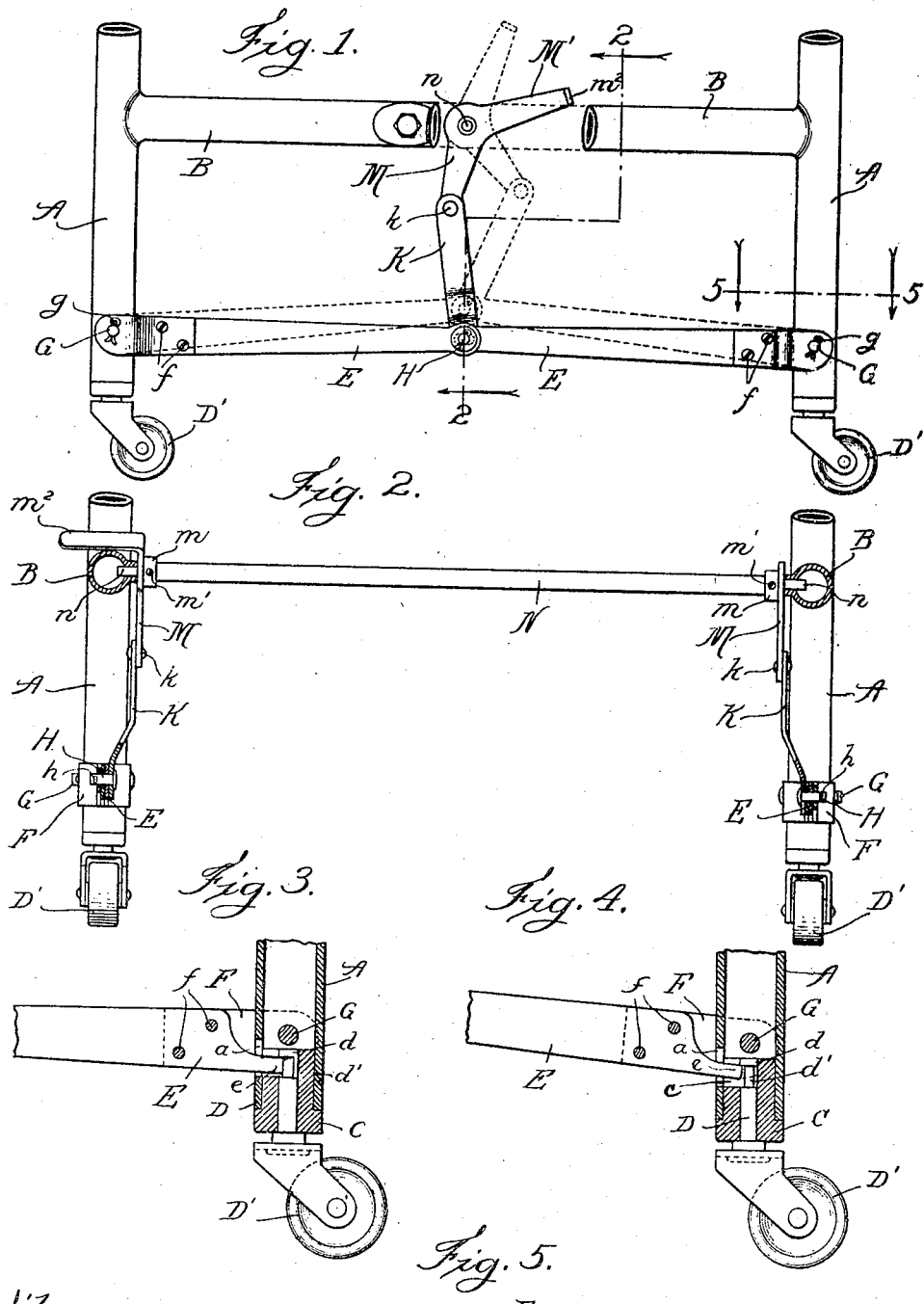

UNITED STATES PATENT OFFICE.

OTTO A. SKIBBE AND OTTO DIEBALL, OF CHICAGO, ILLINOIS.

CASTER-LOCKING MECHANISM FOR STANDS, TABLES, AND THE LIKE.

1,304,711.  Specification of Letters Patent.  Patented May 27, 1919.

Application filed September 28, 1917. Serial No. 193,702.

*To all whom it may concern:*

Be it known that we, OTTO A. SKIBBE and OTTO DIEBALL, citizens of the United States, residing at Chicago, in the county of Cook and State of Illinois, have invented certain new and useful Improvements in Caster-Locking Mechanism for Stands, Tables, and the like, of which we do declare the following to be a full, clear, and exact description, reference being had to the accompanying drawing, forming a part of this specification.

With stands or tables designed for certain purposes, such for example, as are used for supporting calculating machines, typewriting machines, or the like, it is very desirable that the stands or tables shall be mounted upon casters so that they can be conveniently shifted about from place to place, but it is also desirable that provision be made whereby when the machines are in use, the stands or tables will be held so that they will not readily shift or change their position upon the floor. With this end in view, stands or tables for supporting calculating or like machines have heretofore been equipped with casters so connected thereto that when it was desirable to hold the stands or tables in fixed position on the floor, the casters could be raised off the floor so as to permit the legs of the stands or tables to rest on the floor. So, also, it has been proposed to provide brake mechanism for engaging the wheels of the supporting casters so that when such brake mechanism is applied to the wheels they will be held against revolution.

The present invention has for its object to provide simple and effective means whereby when a stand or table is to be shifted from place to place, the caster wheels and their pintles may turn freely and whereby, also, when desired, the pintles of the casters may be locked to prevent the accidental shifting of the table incident to the use of the machine supported thereby. With this object in view, the invention consists in the novel features of construction hereinafter described, illustrated in the accompanying drawing and particularly pointed out in the claims at the end of this specification.

Figure 1 is a side view showing the lower portion of a stand or table having our invention applied thereto. Fig. 2 is a view in cross section on line 2—2 of Fig. 1. Fig. 3 is an enlarged view in vertical section through the lower end of one of the legs of the stand or table and the parts associated therewith. Fig. 4 is a view similar to Fig. 3 but showing the parts in different position. Fig. 5 is a view in cross section on line 5—5 of Fig. 1.

In the accompanying drawing I have shown only the lower part of a stand or table which may be of any suitable construction, such for example, as that illustrated in Letters Patent No. 1,129,429, Skibbe and Salvage, granted February 23, 1915. As shown, the legs of the stand or table are formed of tubular rods A which are connected by suitable transverse rods B. In the lower end of each of the legs A is fitted a plug C in which is journaled the pintle D of the caster wheel D'. In the preferred form of the invention shown, each of the pintles D is provided beneath its head $d$ with a reduced portion $d'$ forming an annular groove to receive the inner end of the brake bar E that projects through a slot or opening $a$ formed in one side of the table leg A of the table. The plug C is preferably extended upward to the top of the pintle D so that the head $d$ of the pintle is given a bearing in the plug, the upper portion of the plug C being cut away or channeled as at $c$ to admit the end $e$ of the brake bar E. To this brake bar E is connected, as by bolts or rivets $f$ the side bars of the yoke F through the ends of which side bars pass a pin G that passes also through the leg A of the stand or table, this pin being held against displacement by a suitable cotter pin $g$.

In the preferred form of our invention, a brake bar E is associated with each of the table legs A and as shown, the inner ends of the brake bars E leading from diametrically opposite legs of the stand or table are pivotally connected by a pin H which passes through the inner ends of the brake bars E and through the lower end of the toggle link K, the pin H being headed at one end and held against displacement by a cotter pin $h$ passing through its opposite end. The upper end of the toggle link K is pivotally connected, as at *k*, to the lower end of a toggle lever M, the hub *m* of which encircles a cross bar N that extends between the oppositely disposed side bars B that unite the legs A (see Figs. 1 and 2). Preferably, the toggle lever M is fixed, as by set screws M', to the bar N, which bar may be provided with pintles or trunnions *n* at its ends, as clearly shown in Fig. 2. The upper arm M' of the toggle lever is preferably formed with an angular extension or treadle $m^2$ whereby the lever may be shifted from the position shown in full lines Fig. 1 to the position shown in dotted lines.

From the foregoing description it will be seen that when the parts are in the position indicated by dotted lines in Fig. 1, the outer ends of the brake bars E will be disengaged from the reduced portion *d'* of the caster pintles D, and under such condition the pintles D will be free to revolve within the sockets C. If, however, the toggle lever M be shifted from the position shown by dotted lines to the position shown by full lines in Fig. 1, the inner pivoted ends of the brake bars E will be depressed, causing these brake bars to turn about the pins G and causing the outer ends *e* of the brake bars to engage the reduced portions *d'* of the caster pintles D, as shown in Fig. 3 of the drawing. This engagement of the ends *e* of the brake bars E with the pintles D will lock such pintles against revolution within the sockets C and when the pintles are so locked, the casters cannot swivel and the accidental slipping or shifting of the stand or table incident to the use of the calculating or like machine mounted thereon is avoided. It will be understood, of course, that if the four caster wheels D' of the stand or table were in alinement, as the two caster wheels indicated in Fig. 1 are shown to be, the stand or table might shift in the direction of the plane of such wheels, but all the caster wheels of a stand or table are seldom in alinement and to guard against any accidental shifting of the table after the caster pintles have been locked, it is only necessary to shift the caster wheels out of alinement.

By reference to Fig. 1 of the drawing it will be seen that when the toggle lever and brake bars are shifted to locked position as indicated by full lines, the toggle lever M and toggle link K are swung across the dead center and the parts therefore remain securely locked until purposely released. The downward movement of the upper lever arm M' is limited by the angular arm $m^2$ contacting with the cross bar B, as indicated in Fig. 2 of the drawings. In the preferred form of the invention, the brake bar E not only serves as a brake mechanism, but also serves to hold the pintle D of the caster in place within its socket C.

While we have described what we regard as the preferred form of our invention, we wish it distinctly understood that the details above set forth may be varied without departing from the scope of the invention.

Having thus described our invention, what we claim as new and desire to secure by Letters Patent is—

1. Caster locking mechanism for a stand or like article, comprising casters beneath said stand having headed pintles, sockets for said pintles, brake bars extending normally beneath the heads of said pintles and serving to retain them in their sockets, and means for moving the brake bars against the pintles to lock the pintles against revolution.

2. Caster locking mechanism for a stand or like article, comprising casters beneath said stand, said casters having pintles provided with annular grooves, brake bars having their free ends extending within said grooves to hold the pintles in place, and means for shifting said brake bars longitudinally to cause them to engage the grooved portions of said pintles and lock said pintles against revolution.

3. Caster locking mechanism for a stand or like article, comprising casters beneath said stand, said casters having vertically disposed headed pintles, blocks within which said pintles are journaled, said blocks extending opposite the heads of said pintles and said blocks having cut away portions at the sides thereof, brake bars having their free ends arranged within the cut away portions of said blocks and beneath the heads of said pintles and serving to hold said pintles in position within the blocks, and means for shifting said brake bars to cause them to lock the pintles against revolution.

4. Caster locking mechanism for a stand or like article comprising casters having vertically disposed pintles, blocks within which said pintles are journaled, pivoted brake bars having their free ends arranged to engage the sides of said pintles and lock them against revolution, and toggle lever mechanism connected to the inner ends of said brake bars.

5. The combination with a stand or like caster locking mechanism for a stand or like article comprising casters provided with revoluble pintles, and brake mechanism to lock said pintles against revolution comprising pivoted brake bars having their outer ends arranged to exert a lateral thrust against said pintles, and toggle lever mechanism connecting the inner ends of said brake bars, said toggle lever mechanism being adapted to swing across the dead center when said mechanism is in locked position.

6. Caster locking mechanism for a stand or like article comprising casters provided with revoluble pintles, blocks within which said pintles are revolubly mounted, and brake mechanism to lock said pintles against revolution, comprising brake bars pivotally mounted adjacent the upper ends of said pintles and having downwardly and outwardly disposed portions adapted to exert a lateral thrust on the pintles, and means for shifting said brake mechanism into engagement with the sides of said pintles to lock said pintles against revolution.

OTTO A. SKIBBE.
OTTO DIEBALL.